Aug. 21, 1962 R. R. TEETOR 3,050,147
SPEED CONTROL DEVICE FOR AN AUTOMOTIVE VEHICLE
Filed Dec. 11, 1956 4 Sheets-Sheet 3

INVENTOR.
Ralph R. Teetor
BY
Davis, Lindsey, Hibben & Noyes
Attys.

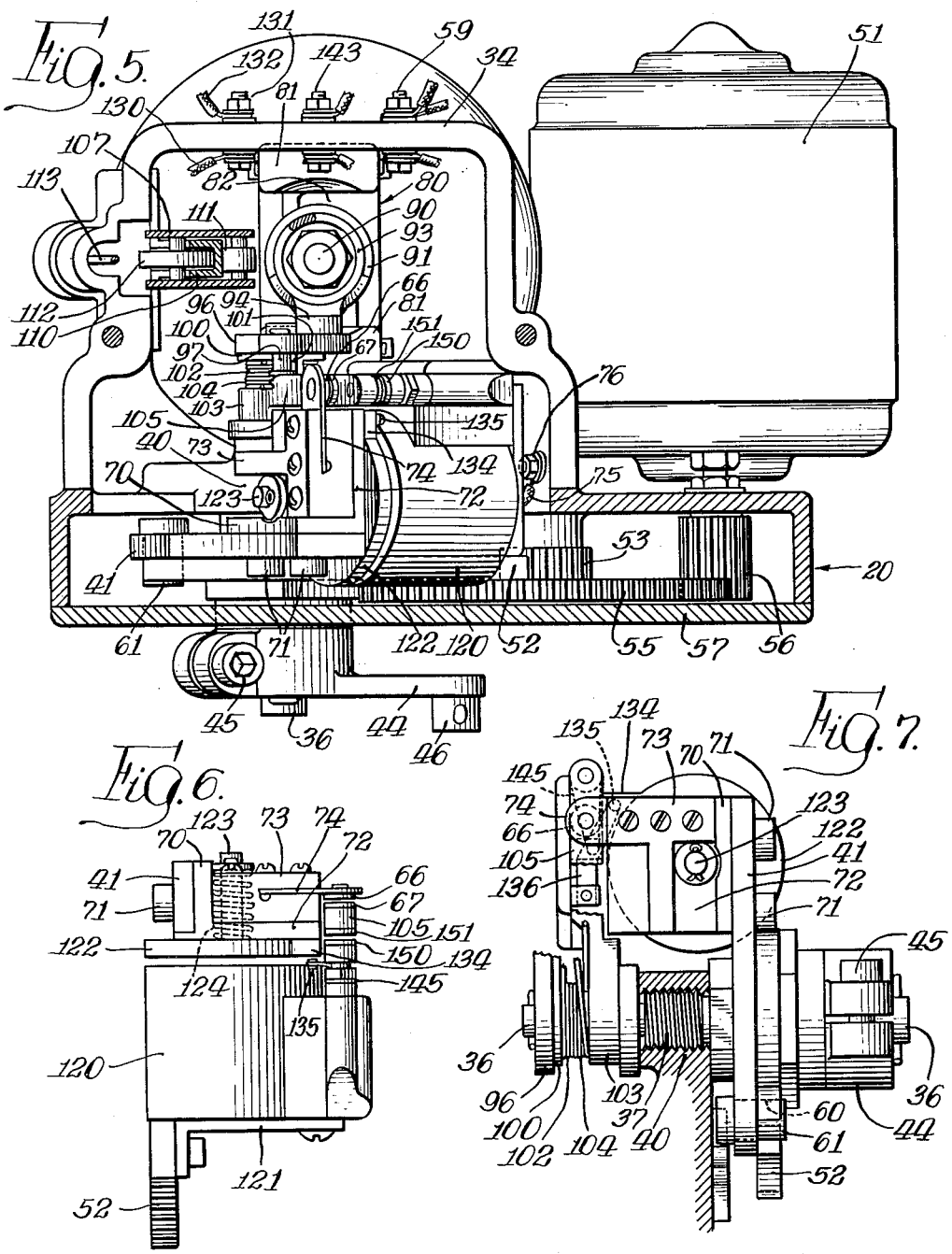

United States Patent Office 3,050,147
Patented Aug. 21, 1962

3,050,147
SPEED CONTROL DEVICE FOR AN AUTOMOTIVE VEHICLE
Ralph R. Teetor, Hagerstown, Ind., assignor to Perfect Circle Corporation, Hagerstown, Ind., a corporation of Indiana
Filed Dec. 11, 1956, Ser. No. 627,650
38 Claims. (Cl. 180—82.1)

The invention relates generally to speed control devices and more particularly to a speed control device for an automotive vehicle.

The general object of the invention is to provide a novel speed control device which offers a resistance to advancing movement of the throttle control member of the engine of the vehicle when a predetermined vehicle speed is attained, and which can hold the throttle control member at a position for operating the vehicle at such speed, when desired, the resistance offered being substantially constant regardless of the operating condition of the engine of the vehicle and being capable of being overcome by the operator of the vehicle if it is desired to exceed such speed.

Another object is to provide a novel speed control device of the foregoing character, in which the resistance to advancing movement of the throttle control member and the force for holding it at a position for operating the vehicle at the predetermined speed are derived respectively from the torque in opposite directions of a reversible rotary drive means.

A further object is to provide electric means, deriving its power from the battery of the vehicle, for providing the resistance to advancing movement of the throttle control member and the force for holding it at a position for operating the vehicle at the predetermined speed, the battery providing substantially constant and adequate power regardless of the operating condition of the engine of the vehicle.

Still another object is to provide a speed control device for an automotive vehicle, operating in a novel manner to provide a resistance to advancing movement of the throttle control member of the engine of the vehicle.

A still further object is to provide a novel speed control device for an automotive vehicle, the device being adapted to advance the throttle control member of the engine of the vehicle when the vehicle is operating below a predetermined speed, the advancing movement continuing until such predetermined speed is reached and then being terminated.

It is also an object to provide a speed control device of the foregoing character, in which the predetermined vehicle speed at which the device functions is adjustable by the driver of the vehicle, and the means for holding the throttle control member at a position for operating the vehicle at such predetermined speed may be disabled by the driver merely by slight actuation of the brake pedal of the vehicle.

Other objects and advantages will become apparent from the following description taken in connection with the accompanying drawings, in which:

FIG. 5 is a top plan view with a portion of the housing removed;

FIG. 6 is a fragmentary view taken on the line 6—6 of FIG. 4;

FIG. 7 is a fragmentary view taken on the line 7—7 of FIG. 2; and

FIG. 8 is a wiring diagram of the electrical circuits of the device.

Figure 1:
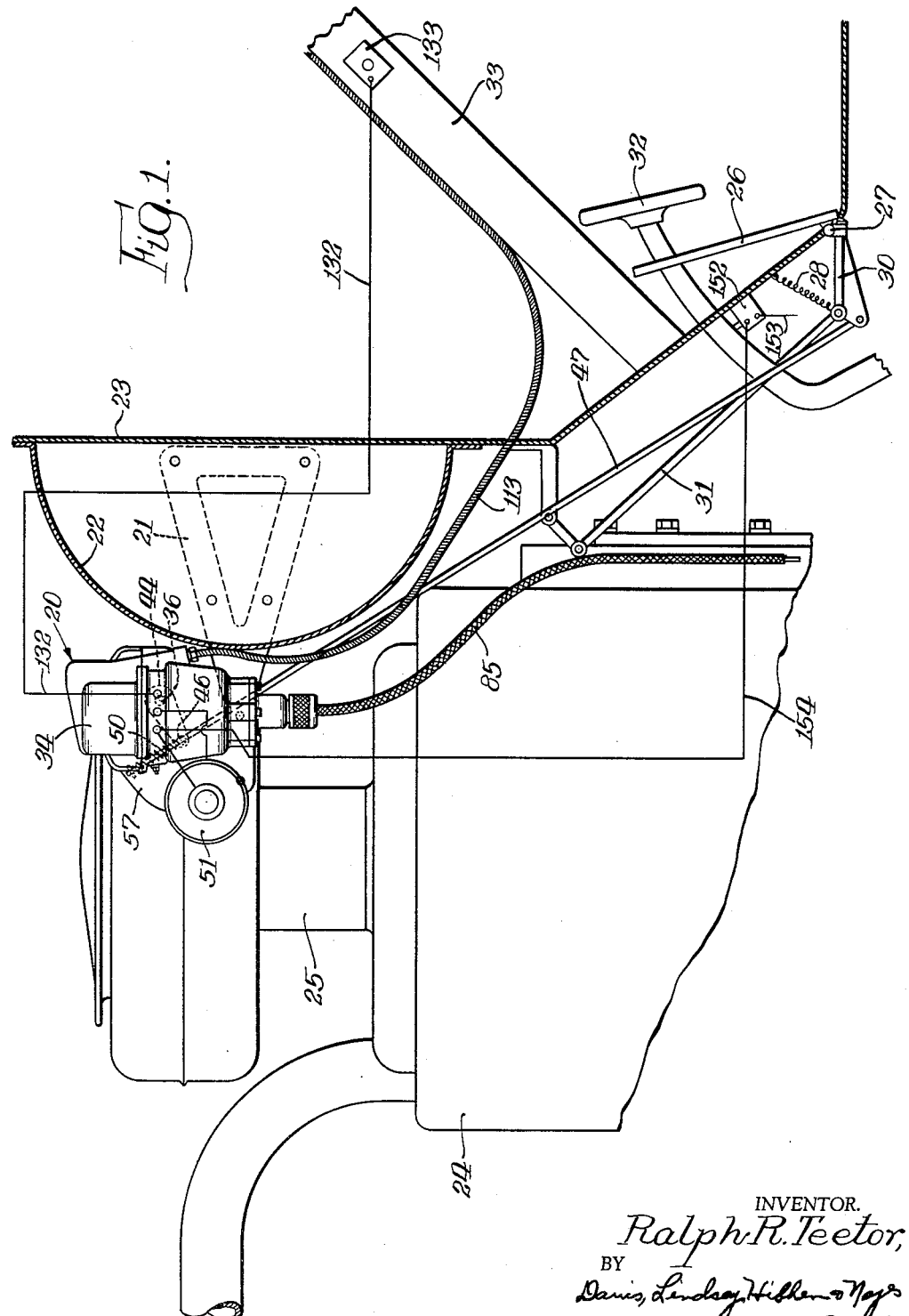
FIG. 1 is a fragmentary sectional view of an automotive vehicle provided with a speed control device embodying the features of the invention.

In my Patent No. 2,519,859, issued August 22, 1950, a speed control device for an automotive vehicle is disclosed, which indicates to the driver through a resistance to depression, or advancing movement, of the throttle control member or accelerator pedal that a predetermined vehicle speed has been reached, the device, however, permitting movement of the accelerator pedal beyond the point at which such resistance occurs, so that such predetermined speed may be exceeded when the need is present. The device of said patent provides for adjustment by the driver of the speed at which such resistance occurs so that it can be suited to what is proper for any given road condition or speed limit. That device utilizes a pressure fluid of the vehicle for the motivating force, and in the specific form shown in the patent, vacuum available in the intake manifold of the engine of the vehicle is employed.

In my copending application Serial No. 436,529, filed June 14, 1954, now Patent No. 2,916,100, a speed control device is shown, which is similar to that shown in said patent, in that a resistance to advancing movement of the throttle control member occurs at a predetermined vehicle speed. The device shown in said application, however, also includes means for holding the throttle control member in a position which results in operation of the vehicle at such predetermined speed so that the driver, in the case of the ordinary automobile, may remove his foot from the accelerator pedal and the vehicle will continue to operate at such speed. The device of said application is arranged so that the driver may immediately disable the holding means merely by slight depression of the brake pedal of the vehicle so that the vehicle is returned to normal operation under full control by the driver.

The speed control device shown in said application, similarly to the device shown in said patent, is adapted to be operated by fluid pressure such as the vacuum of the intake manifold of the engine. However, the degree of vacuum in the intake manifold varies with different operating conditions of the engine. Consequently, the resistance offered to advancing movement of the accelerator pedal as well as the force utilized for holding the pedal in position to attain a predetermined vehicle speed varies.

The present device functions both to provide a resistance to advancing movement of the accelerator pedal at a predetermined vehicle speed as well as to hold the pedal in a position to attain such speed as in the case of the device shown in said application, but utilizes electrical drive means to accomplish these functions. Thus, the battery of the vehicle may be used as a source of power, and since the battery provides substantially constant power, the resistance offered to advancing movement of the accelerator pedal and the force for holding the pedal in position to produce the desired speed are maintained substantially constant. Such resistance and holding force are derived, in the present device, from a torque in opposite directions provided by a reversible rotary drive means comprising a reversible electric motor.

Energization of the motor is controlled by a governor responsive to the speed of the vehicle. Thus, when the vehicle reaches a predetermined speed, the governor effects energization of the motor for one direction of rotation and the torque thus obtained provides a resistance to advancing movement of the accelerator pedal and tends to move the accelerator pedal toward idle position until the speed of the vehicle is below such predetermined value. If the accelerator pedal is held by the driver of the vehicle at a position where such speed is maintained, the motor is stalled and the resistance is maintained. If the driver permits the accelerator pedal to move toward idle position, the governor opens the motor circuit to deenergize the motor when the vehicle speed falls below such predetermined value.

For holding the accelerator pedal in a position to maintain a predetermined vehicle speed and permit the driver to remove his foot from the accelerator pedal, the governor is arranged to energize the motor for rotation in the opposite direction from that utilized for the resistance. Such holding can be effected only under a manually controlled means so that it is operable only when desired. For such holding, the governor effects energization of the motor when the vehicle is operating at a speed below the predetermined value, and the motor in this instance exerts a torque tending to advance the accelerator pedal and thus increase the speed of the vehicle. When the predetermined vehicle speed is attained, the motor is deenergized for such direction of rotation and is energized for rotation in the direction that provides a resistance to further advancing movement of the accelerator pedal.

Since the governor is responsive to vehicle speed, the position of the accelerator pedal at which the motor is energized and deenergized will vary for any predetermined speed for which the device is set, depending upon road conditions. Thus, if road resistance is increased because of the pavement or because of an upgrade, the accelerator pedal would be advanced farther before the governor energizes or deenergizes the motor, as the case may be. Correspondingly, if the road resistance is decreased, the governor functions at a less advanced position of the accelerator pedal. The vehicle speed at which the governor functions is adjustable by an adjusting member placed at a convenient point for manipulation by the driver. Thus, the driver may at his convenience make an adjustment of the vehicle speed at which resistance to advancing movement of the accelerator pedal will occur and to which the vehicle will be held when the holding means is rendered operable. The holding means becomes effective when desired by the driver, through the use of a control circuit that can be established only by a manually operable switch placed conveniently near the driver. This control circuit is such that, while it can be established only by operation of the manually operable switch, it is self-maintained so the switch does not have to be held closed by the operator. For safety purposes, the control circuit is opened, to disable the holding means, by operation of the brake pedal of the vehicle, so that the vehicle is returned to normal control by the driver the moment the brake pedal is depressed.

In the drawings, one embodiment of the invention is illustrated and in FIG. 1 it is shown as mounted on an automotive vehicle such as an automobile of usual construction. The device is arranged to be mounted under the hood of the vehicle adjacent the engine. Thus, the device is indicated generally at 20 and is shown as being mounted on a bracket 21 illustrated in this instance as attached to the side of the heater box 22, the latter extending forwardly from the fire wall 23 separating the space under the hood from the driver's compartment of the vehicle. In different makes of vehicles, the manner of the mounting device will differ slightly, depending upon the space available under the hood, and the manner of mounting herein illustrated is merely typical. The device 20 is preferably mounted adjacent the engine, indicated at 24, and the carburetor, a portion of which is shown at 25. The driver-operated throttle control member or accelerator pedal for the vehicle is shown at 26 and is illustrated as being pivotally supported at 27 and connected to a lever 30 having a link 31 for operating the usual throttle valve (not shown) of the carburetor 25. The accelerator pedal 26 tends to return to idle position under the influence of a spring such as the spring 28. The brake pedal of the vehicle is indicated at 32 while the steering wheel post is shown at 33.

Figure 2:
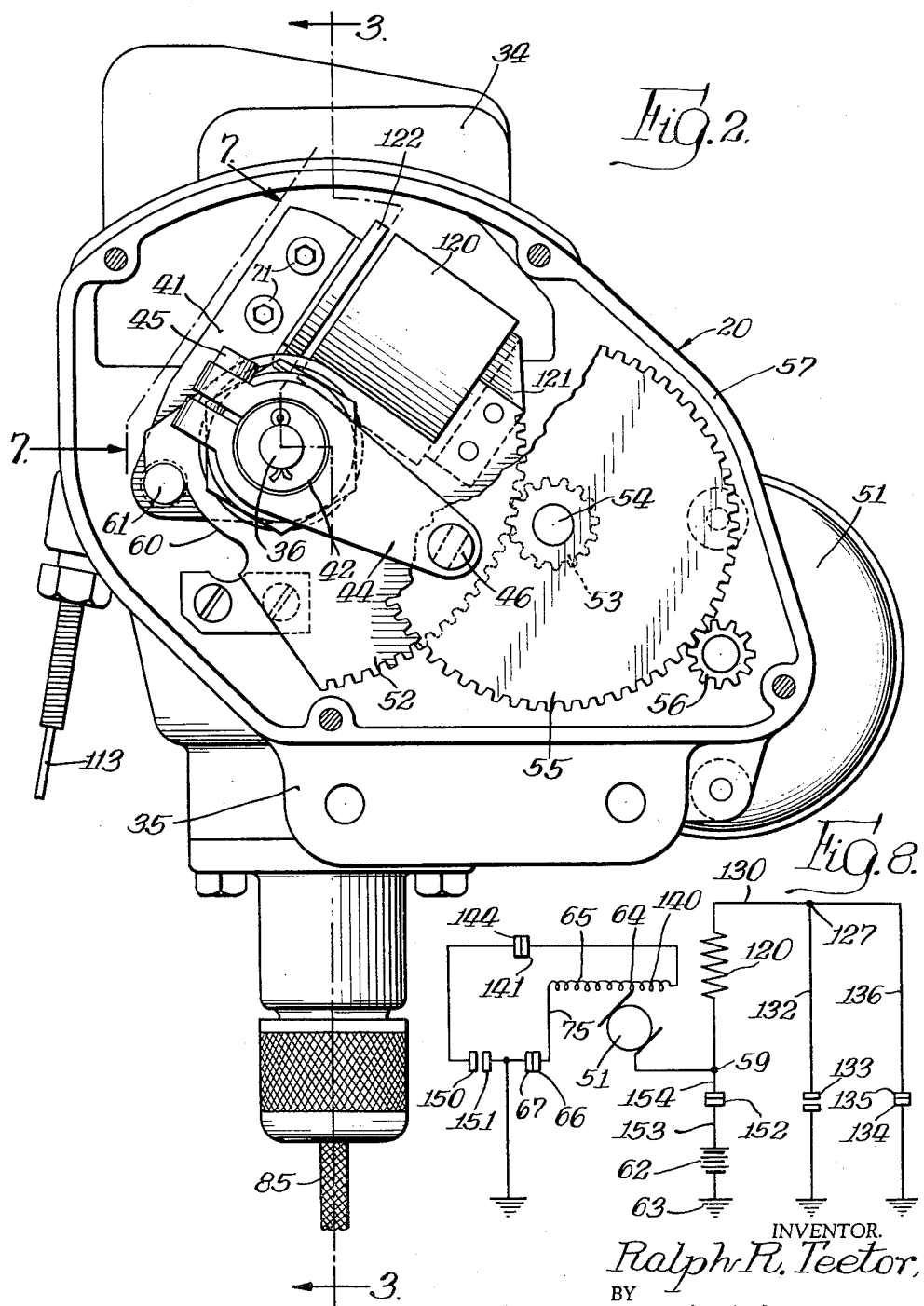
FIG. 2 is a side elevational view of the speed control device shown in FIG. 1 but taken at the opposite side from that shown in FIG. 1 and with a portion of the housing removed.
Figure 3:
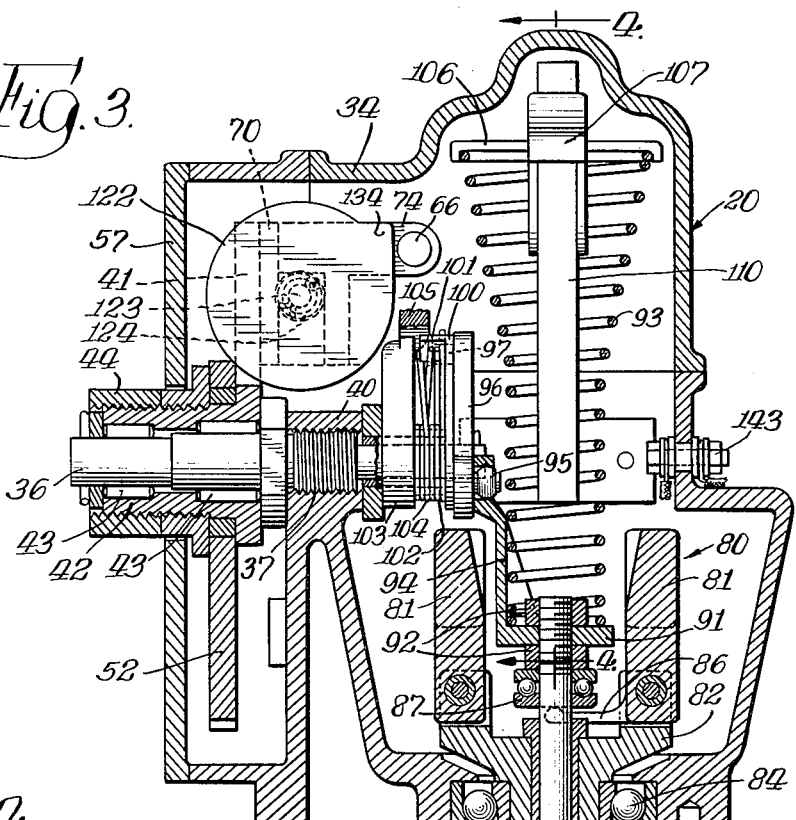
FIG. 3 is a vertical sectional view taken on the line 3—3 of FIG. 2.

The construction of the device 20 is shown in detail in FIGS. 2 to 7 and comprises a housing 34 having a mounting pad 35 (see FIG. 2) adapted to be secured to the bracket 21. Most of the movable parts of the device are supported on a stationary shaft 36 having a threaded portion 37 (see FIG. 3) intermediate its ends secured in a boss 40 formed in the interior of the housing 34. Mounted on one end of the shaft 36 is a rotatable carrier member 41 having a hub portion 42 rotatably supported on the shaft 36 by a pair of bearings 43. The hub portion 42 projects exteriorly of the housing 34, as shown in FIG. 2, and is threaded to receive the hub of a lever 44 clamped thereon by a screw 45 and adapted to be connected to the throttle control member or accelerator pedal 26. In the present instance, the lever 44 is resiliently connected to the accelerator pedal 26 for reasons to be hereinafter described. Thus, the lever 44 at its free end is provided with an eye 46 slidably receiving a rod 47 (see FIG. 1). Between the eye 46 and a cross pin in the adjacent end of the rod 47 is a coiled spring 50. The other end of the rod is adapted to be connected to the lever 30 of the accelerator pedal 26.

As heretofore mentioned, the device is adapted to provide a resistance to advancing movement of the throttle control member or accelerator pedal when the vehicle reaches a predetermined speed, such speed being adjustable by the driver of the vehicle. In the present instance, the resistance is transmitted to the accelerator pedal from the rotatable member 41. The resistance is provided by electrical means and is derived from the torque of an electric motor. To this end, the rotatable member is connected to an electric motor 51 by gearing including a gear sector 52 rotatably mounted on the hub portion 42 of the rotatable member 41. The gear sector 52 meshes with a pinion 53 (see FIGS. 2 and 5) mounted on a stub shaft 54 supported in the housing 20. The pinion 53 is rigid with a gear 55 which in turn meshes with a pinion 56 mounted on the drive shaft of the motor 51. The latter is secured to an extension 57 of the housing 34. The gear sector 52 is connected to the rotatable member 41 by a lost-motion connection, the purpose of which will be hereafter described, and which comprises an arcuate slot or recess 60 in the gear sector 52 and a pin 61 extending from the adjacent face of the rotatable member 41 and adapted to engage the respective ends of the slot 60, depending upon the relative direction of rotation of the two parts.

The torque of the motor 51 transmitted through the gearing to the rotatable member 41 provides the resistance opposing advancing movement of the accelerator pedal 26 when the vehicle reaches a predetermined speed. With the gearing and the connections shown in the drawings, energization of the motor 51 for counterclockwise rotation of the drive shaft of the motor, as viewed in FIG. 2, provides such resistance. Thus, when the motor is so energized, the gear sector 52 will be rotated in a counterclockwise direction and, when the pin 61 engages the left end of the slot 60, as shown in FIG. 2, the torque of the motor provides a resistance tending to move the accelerator pedal 26 toward idle position. The motor is preferably a series wound motor so that it provides a maximum torque, and hence a maximum resistance to advancing movement of the accelerator pedal 26, when the motor is stalled by holding the accelerator pedal at the point where resistance to advancing movement occurs, in other words, at the predetermined vehicle speed for which the device is set.

For energizing the motor 51 to provide the resistance at a predetermined vehicle speed, the motor is adapted to be operated by the battery of the vehicle, since the battery provides a substantially constant voltage not subject to the operating condition of the engine of the vehicle at any particular instant. Being a series wound motor, the armature thereof is connected to an insulated binding post 59 mounted in the wall of the housing 34 and the post 59 is connected to the battery of the vehicle, indicated at 62 in the wiring diagram of FIG. 8. One side of the battery is grounded as at 63 to the vehicle as is common practice. The other side of the motor armature is connected to the field winding of the motor at a point 64 intermediate the ends of the winding for reasons that will subsequently become apparent. The portion of the field winding, indicated at 65, at one side of the point 64 is wound in a direction to produce counterclockwise rotation of the motor as viewed in FIG. 2. To energize the motor in this manner, the portion 65 of the field winding is adapted to be grounded through a branch circuit including a pair of contacts 66 and 67.

Engagement of the contacts 66 and 67 is controlled by the position of the rotatable member 41 as determined by the position of the accelerator pedal 26, and by a means responsive to the speed of the vehicle. The rotatable member 41 carries an L-shape bracket 70 secured to the member 41 as by screws 71 (see FIGS. 5, 6 and 7). One leg of the bracket 70 lies against the face of the member 41 while the other leg, indicated at 72, extends perpendicularly therefrom. Mounted on the leg 72 is a T-shaped block 73 of insulating material carrying a conductor strip 74 projecting therefrom and having the contact 66 provided on its end. The strip 74 is connected by a wire 75 (see FIG. 4) to an insulated binding post 76 in the wall of the housing 34, and the binding post 76 is in turn connected to the end of the portion 65 of the field winding of the motor.

The means responsive to the speed of the vehicle is in this instance, a centrifugal governor indicated generally at 80 (see FIGS. 3, 4 and 5) and mounted in the casing 34. The governor 80 comprises a pair of centrifugal weights 81 pivotally mounted on a rotating head 82. The head 82 has a tubular shaft portion 83 journalled in bearings 84 in the housing and having a portion extending exteriorly of the housing and adapted to be connected to a drive means rotating in timed relation to the vehicle speed, such as a flexible cable 85 (see FIGS. 1 and 3) adapted to be connected to the speedometer drive of the vehicle. The governor weights 81 are provided with inwardly extending arms 86 bearing against a thrust bearing 87 mounted on a plunger 90 slidable in the tubular shaft portion 83. Also mounted on the plunger 90 is a collar 91 secured to the plunger by a pair of lock nuts 92. A trumpet-shaped spring 93 bears against the collar 91 to oppose the movement of the collar by the centrifugal weights 81.

Figure 4:
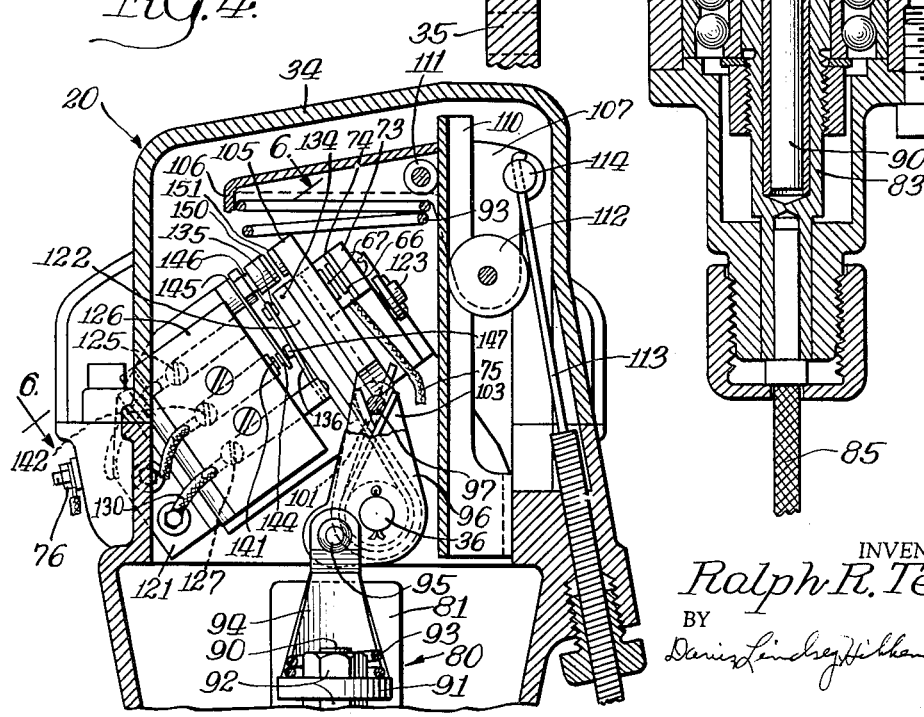
FIG. 4 is a fragmentary vertical sectional view taken on the line 4—4 of FIG. 3.

The collar 91 has an upwardly extending arm 94 connected to means for shifting the contact 67 into engagement with the contact 66 and thus energize the motor 51. The shifting means has a yieldable connection to limit the pressure of the contact 67 against the contact 66 exerted by the governor. Thus, the arm 94 has a pivotal connection 95 with lever means comprising a bell-crank lever 96 pivotally mounted on the inner end of the shaft 36. Lever 96 at its free end is provided with a laterally extending pin 97. In side-by-side relation with lever 96 is a second lever 100 having a laterally extending wing 101, and a torsion spring 102 wrapped around the shaft 36 has its ends respectively engaging the pin 97 and wing 101, tending to hold them together so that the lever 100 tends to move with the lever 96 when the latter is moved by the governor. Thus, when the lever 96 is moved in a clockwise direction as shown in FIG. 4, the lever 100 will move with it, but if the lever 100 is held against movement, the lever 96 can continue to move with the torsion spring 102 yielding. When the lever 96 is moved in a counterclockwise direction, the pin 97 engages the wing 101 and the lever 100 moves with the lever 96.

Also mounted on the shaft 36 is a contact lever 103 resiliently connected to the lever 100 by a second torsion spring 104 wrapped around the shaft 36 and having one of its ends engaging the lever 103 and the other engaging the wing 101 on lever 100. When lever 100 is moved counterclockwise, as shown in FIG. 4, by the lever 96, the lever 103 tends to move with it, but if the lever 103 is held against movement, the lever 100 can continue to move with the torsion spring 104 yielding. When the lever 100 is moved clockwise, the wing 101 engages a portion of lever 103 to move the latter. The lever 103 carries an arm 105 extending upwardly at an angle adjacent the contact 66, and the arm 105 has the contact 67 mounted thereon.

With this construction, when the vehicle reaches a predetermined speed, outward movement of the governor weights 81 shifts the collar 91 upwardly against the pressure of the governor spring 93. Such movement of the collar 91 swings the lever 96 clockwise as viewed in FIG. 4 and the contact lever 103 with its arm 105 will be swung in the same direction. The contact 67 will thus be moved into engagement with the contact 66 and, since the contact 67 is grounded through the arm 105 because of mounting of the latter, the branch circuit for the motor through the portion 65 of the field winding of the motor is energized and will tend to rotate in a counterclockwise direction as viewed in FIG. 2. This results in counterclockwise rotation of the gear sector 52 until the left hand end of the slot 60 in the gear sector engages the pin 61 on the rotatable member 41. The motor then tends to rotate the member 41 counterclockwise, thus tending to move the accelerator pedal 26 toward idle position. If the accelerator pedal 26 is held against such movement by the driver, the motor will be stalled and will exert a maximum torque opposing the pressure of the driver's foot. If the accelerator pedal is permitted to move toward idle position, as soon as the vehicle speed falls below the speed for which the governor is set, the contact 67 will be moved away from the contact 66 and the motor will be deenergized.

Should the accelerator pedal be held at a position for maintaining the resistance to advancing movement of the accelerator, the latter may still be advanced farther in spite of the resistance. An increase in vehicle speed may be needed at some time under these conditions, as, for example, in passing another vehicle running only slightly slower than the speed for which the device is set. In that case, even though the resistance due to the torque of the motor opposes advancing movement of the accelerator pedal, the latter may be further advanced, without having to turn the motor backward, because of the spring 50 on the rod 47 connecting the lever 46 with the lever 30 of the accelerator pedal. Under such circumstances, the spring 50 will be compressed by movement of the rod 47 relative to the lever 44.

As heretofore mentioned, when the vehicle speed increases to the predetermined value, the lever 96 causes the arm 105 to move the contact 67 into engagement with the contact 66. If the accelerator pedal is held against the resistance due to the torque of the motor so that the contact 66 is held against movement, and if the vehicle speed should increase, the governor will tend to move the lever 96 farther. Under such conditions, the torsion spring 102 will yield to limit the pressure placed on the contacts 66 and 67.

The purpose of the arcuate slot 60 in the gear sector 52 is to permit the rotatable member 41 and the accelerator pedal 26 to return to idle position without causing rotation of the motor. Thus, the pin 61 on the rotatable member 41 is free to move the length of the slot 60 under the influence of the usual spring, such as the spring 28, tending to move the accelerator pedal back to idle position. The arcuate length of the slot 60 is sufficient for the entire range of movement of the accelerator pedal. Thus, the accelerator pedal can return to idle position at any time in its normal manner.

The predetermined speed of the vehicle at which the device functions is determined by the setting of the governor spring 93. To adjust the pressure exerted by the spring 93, the upper end bears against a cap 106 formed on a bifurcated slide 107 vertically movable on a channel member 110 rigidly mounted in the casing. The slide 107 has a small roller 111 engaging the outer face of the web of the channel 110 and a larger roller 112 fitting within the channel 110 and engaging the inner face of the web. The rollers 111 and 112 are so positioned as to hold the cap 106 squarely against the spring 93. To adjust the slide 107, a Bowden wire 113 is connected to a pin 114 in the slide and extends through the wall of the housing 34 and then to a position where it may be readily actuated by the driver, such as on the steering post 33. The pressure exerted by the spring 93 against the action of the governor weights may thus be varied so as to determine the vehicle speed at which the resistance due to the torque of the motor is applied to the accelerator pedal.

As heretofore mentioned, the device also includes means for holding the accelerator pedal in such position that the vehicle will be maintained at a predetermined speed. The holding means is at all times under the control of the driver but enables him to remove his foot from the accelerator pedal when the holding means is functioning. The holding means can be caused to function only by the driver and may be disabled by the driver merely by pressing on the brake pedal, to return the vehicle to normal control. The holding means when functioning tends to advance the accelerator pedal when the vehicle is operating at a speed below a predetermined speed but as soon as the vehicle reaches such predetermined speed, the holding means no longer tends to advance the accelerator pedal, and should the vehicle speed increase slightly from that point, the resistance to advancing movement of the accelerator pedal becomes effective.

Since the holding means can become effective only at the will of the driver, certain relationships of parts must be established by him to cause the holding means to function. In the present instance, the rotatable member 41 is adapted to be secured to the gear sector 52 by a manually controlled means to establish such relationships. To this end, an electromagnet 120 (see FIGS. 2, 5 and 6) is mounted on an L-shape bracket 121 secured to one face of the gear sector 52. Cooperating with the electromagnet 120 is an armature in the form of a generally circular plate 122 carried on a pin 123 extending perpendicularly from the center of the armature. The pin 123 extends through the leg 72 of the L-shape bracket 70 carried by rotatable member 41. Between the leg 72 and a washer on the end of the pin 123 is a spring 124 tending to hold the armature against the leg 72. The left end of the slot 60 in the gear sector 52 limits the movement of the rotatable member 41 relative to the gear sector 52 in such a manner that, when the pin 61 engages the left end of the slot 60 and the spring 124 holds the armature 122 against the leg 72, the armature is spaced a slight distance from the electromagnet 120. When the electromagnet is energized, the armature 122 is drawn into engagement with the electromagnet against the pressure of the spring 124. The rotatable member 41 and the gear sector 52 can thus be secured together.

To energize the electromagnet 120, manually controlled means is provided. Thus, the binding post 59 which is connected to the side of the battery 62 that is connected to the armature of the motor 51 is also connected to a terminal 125 on a terminal block 126 mounted on the side of the electromagnet 120. The terminal 125 is connected to one end of the coil of the electromagnet as indicated in the wiring diagram of FIG. 8. The other end of the coil of the electromagnet is connected to a terminal 127 and a wire 130 extends therefrom to another insulated binding post 131 on the side of the housing 34. From the binding post 131, a line 132 extends to a push-button switch 133 located in a position convenient to the driver such as on the steering column 33. The switch 133 is grounded as indicated in the wiring diagram of FIG. 8. Thus, when the push-button switch 133 is closed, the electromagnet is energized and the armature will be drawn into engagement with the end of the electromagnet. The electromagnet does not have sufficient strength to draw the armature against it unless the armature is close to the electromagnet as when the pin 61 is at the left of the slot 60. This necessitates rotating the rotatable member 41 by advancing the accelerator pedal to move the armature 122 adjacent the electromagnet.

The push-button switch 133 need only be held closed momentarily, because a holding circuit for the electromagnet becomes effective as soon as the armature is moved into engagement with the electromagnet. Thus, the armature 122 which is generally circular, is provided with an angular projection 134 adapted to engage a contact 135 on the end of a leaf spring 136. The spring 136 is mounted on the terminal 127, and since the armature 122 through its mounting is grounded, the electromagnet remains energized and the push-button switch 133 may be released as soon as the armature engages the electromagnet.

For holding the accelerator pedal in a position to operate the vehicle at a predetermined speed, the motor 51 is adapted to be operated in a direction opposite to that providing the resistance and thus is a reversible motor. To this end, the portion of the field winding other than the portion 65, indicated at 140, is utilized. Since the portion 140 is wound in the same direction as the portion 65 but the current flows oppositely in the two portions, the motor will operate in a clockwise direction as viewed in FIG. 2 when the portion 140 is energized. The branch circuit including the portion 140 also includes two pairs of contacts which must be closed to energize the motor for such rotation, one pair being closed when the armature 122 is drawn into engagement with the electromagnet 120, and the other pair being closed by the governor 80 when the speed of the vehicle is below a predetermined value.

The first-mentioned pair of contacts adapted to be closed when the electromagnet is energized, comprise a contact 141 provided on a terminal 142 on the terminal block 126. The terminal 142 is connected by a wire extending to an insulated binding post 143 mounted in the wall of the housing 34 adjacent the binding posts 59 and 131. The binding post 143 is connected to the end of the portion 140 of the field winding of the motor. Cooperating with the contact 141 is another contact 144 carried on a spring arm 145 mounted on a screw 146 secured to the terminal block 126. The contacts 141 and 144 are normally separated but the contact 144 is adapted to be moved into engagement with the contact 141 by movement of the armature 122 into engagement with the electromagnet 120. Thus, when this occurs, an insulating button 147 on the spring arm 136 presses the contact 144 into engagement with the contact 141.

The pair of contacts caused to be engaged by the governor 80 comprise a contact 150 positioned on the end of the screw 146, and a contact 151 mounted on the lever arm 105 and grounded thereby. When the governor 80 indicates a vehicle speed below that for which the governor is set, the governor spring 93 forces the collar 91 downwardly, and the arm 94 on the collar 91 swings the lever 96 counterclockwise as viewed in FIG. 4. This movement of the lever 96 swings the lever 103, through the lever 100 and the torsion spring 104, so that the arm 105 moves the contact 151 into engagement with the contact 150. The armature 122 having been previously drawn into engagement with the electromagnet 120, the contacts 141 and 144 are also in engagement so that the branch circuit through the portion 140 of the field winding is closed. The motor is thus energized to cause the motor to rotate in a clockwise direction as viewed in FIG. 2. This results in the gear sector 52 being driven in a clockwise direction and the rotatable member 41, being secured to the gear sector 52 by the electromagnet 120, is also moved in a clockwise direction to advance the accelerator pedal 26 to increase the vehicle speed. If the vehicle speed is so low, before such increase occurs, that the governor tends to swing the arm 105 beyond the point where the contact 151 engages the contact 150, the torsion spring 104 yields, thus avoiding undue pressure on the contacts 150 and 151.

The portion 140 of the field winding of the motor need be only large enough to produce a torque sufficient to overcome the spring 28 that is normally provided in the vehicle to move the accelerator pedal to the idle position. This torque is thus sufficient to advance the accelerator pedal when the holding means is set and the speed of the vehicle is below the predetermined value. The portion 65 of the field winding is large enough to produce a torque sufficient to provide a substantial resistance to advancing movement of the accelerator pedal. In the present instance, the portion 65 is about two-thirds of the total length of field winding, while the portion 140 is about one-third of the total length.

When the vehicle speed reaches the predetermined value for which the governor spring 93 is set, the governor causes the arm 105 to swing to move the contact 151 out of engagement with the contact 150, thus opening the circuit through the portion 140 of the field winding and deenergizing the motor so that the accelerator pedal is no longer advanced. If the vehicle at this point slightly exceeds the predetermined speed, the arm 105 swings sufficiently to engage the contacts 66 and 67, thus rendering the resistance effective. The contacts 150 and 66 are so spaced that arm 105 cannot cause the contacts thereon to engage the contacts 150 and 66 at the same time. In other words, the contact 151 must be disengaged from the contact 150 before the contact 67 can engage the contact 66 and vice versa. Adjustment of the pressure of the governor spring 93 by the driver through the Bowden wire 113, of course, adjusts the speed below which the accelerator pedal will be advanced and at which the winding portion 140 of the motor is deenergized, as well as the speed at which resistance to advancing movement of the accelerator pedal occurs. While such resistance is established at a slightly higher speed than that at which the winding portion 140 is deenergized because of the slight movement required for the arm 105 in breaking contact between the contacts 150 and 151 and in making contact between the contacts 66 and 67, such slight movement represents only one or two miles per hour in vehicle speed.

When the holding means has been set up by the driver by energizing the electromagnet 120, it is desirable to be able to disable the holding means by a movement on the part of the driver that he will normally take when an emergency arises. In most emergencies, the driver first presses on the brake pedal to reduce the speed of the vehicle. For that reason, the holding means is adapted to be rendered inoperable whenever the brake pedal 32 is depressed, and the holding means then remains inoperable until intentionally reestablished by the driver. To this end, a brake-operated switch 152 is interposed between the battery 62 and the electromagnet 120 and the motor 51. Thus, the switch 152 is connected to the battery by a wire 153 (see FIGS. 1 and 8) and to the binding post 59 by a wire 154. The switch 152 is normally closed, that is, when the brake pedal 32 is released. However, the moment the brake pedal is depressed, even slightly, the switch 152 is opened, thus deenergizing the motor 51 as well as the electromagnet 120. When the latter is deenergized, the spring 124 moves the armature 122 out of engagement with the electromagnet 120 and the angular projection 134 on the armature 122 moves out of engagement with the contact 135 on the spring arm 136 to deenergize the electromagnet. This also causes the contacts 141 and 144 to separate so that the portion 140 of the field winding of the motor can no longer be energized. Thus should the vehicle speed fall below the predetermined value and the contacts 150 and 151 be closed, the winding portion 140 will not be energized because the contacts 141 and 144 are open. The latter contacts can only be closed by reenergization of the electromagnet 120 by use of the push-button switch 133.

From the foregoing description, it will be apparent that I have provided a novel device which offers resistance to advancing movement of the throttle control member or accelerator pedal of an automotive vehicle when the vehicle reaches a predetermined speed. The device also provides means for holding the accelerator pedal in a position to result in such predetermined speed when the driver of the vehicle desires to operate the vehicle constantly at such speed so that he may remove his foot from the accelerator pedal. The device utilizes an electrical means in the form of a reversible electric motor, the torque of which when energized for one direction of rotation provides the resistance, and the torque derived when the motor is energized for the opposite direction of rotation being utilized to advance the accelerator pedal when the vehicle is below the predetermined value to hold the accelerator at the position to maintain such speed. The holding means can be rendered operable only when desired by the driver and is disabled by a slight movement of the brake pedal so that the vehicle is returned to normal control on operation of the vehicle brakes. The speed at which the device is effective may be adjusted by the driver during operation of the vehicle, so that varying road conditions and speed limits can be met.

I claim:

1. A speed control device for an automotive vehicle having a driver-operated throttle control member, comprising a rotatable member adapted to be rotated in one direction by said control member on advancing movement of the latter, drive means, means driven by said drive means for applying torque to said rotatable member in opposition to rotation in said direction, to provide opposition to advancing movement of said throttle control member, means responsive to the speed of the vehicle, and control means comprising a pair of parts movable respectively by said speed responsive means and said rotatable member and engageable with each other for energizing said drive means at a predetermined vehicle speed.

2. A speed control device for an automotive vehicle having a driver-operated throttle control member, comprising a rotatable member, a lever connected to said rotatable member and adapted to be connected to said throttle control member for rotating said rotatable member in one direction on advancing movement of said throttle control member, power-operated means including a rotatable element for applying a reverse torque to said rotatable member to oppose advancing movement of said throttle control member, means responsive to the speed of the vehicle and including an arm engageable with said rotatable member, and control means operable on engagement of said arm and said rotatable member for energizing said drive torque applying means for applying said reverse torque at a predetermined vehicle speed.

3. A speed control device for an automotive vehicle having a driver-operated throttle control member, comprising a rotatable member adapted to be rotated in one direction by said control member on advancing movement of the latter, an electric motor drive including a rotatable element engageable with said member for applying a torque to said rotatable member in opposition to rotation in said direction, and means movable in response to the speed of the vehicle, and means operable by relative movement of said movable means and said rotatable member for energizing said motor drive at a predetermined vehicle speed.

4. A speed control device for an automotive vehicle having a driver-operated throttle control member, comprising a rotatable member adapted to be rotated in one direction by said control member on advancing movement of the latter, an electric motor, gearing connecting said motor and said rotatable member for applying the torque of said motor in opposition to rotation of said rotatable member in said direction, means responsive to the speed of the vehicle, and means actuated by said speed-responsive means and said rotatable member for energizing said motor at a predetermined vehicle speed.

5. A speed control device for an automotive vehicle having a driver-operated throttle control member, comprising a rotatable member adapted to be rotated in one direction by said control member on advancing movement of the latter, an electric motor drive including a rotatable element engageable with said member for applying a torque to said rotatable member in opposition to rotation in said direction, a governor responsive to the speed of the vehicle, and means operable by the governor at a predetermined vehicle speed and the movement of said rotatable member in said direction, for energizing said motor drive.

6. A speed control device for an automotive vehicle having a driver-operated throttle control member, comprising an operating member adapted to be moved in one direction by said control member on advancing movement thereof, electrical means for opposing movement of said operating member in said direction, an energizing circuit for said electrical means including a pair of contacts, one carried by and movable with said operating member, and means responsive to the speed of the vehicle for moving the other contact into engagement with said one contact at a predetermined vehicle speed for energizing said electrical means.

7. A speed control device for an automotive vehicle having a driver-operated throttle control member, comprising an operating member adapted to be moved in one direction by said control member on advancing movement thereof, electrical means for opposing movement of said operating member in said direction, an energizing circuit for said electrical means including a pair of contacts, one carried by and movable with said operating member, a governor responsive to the speed of the vehicle, and means carrying the other contact and movable by the governor to move said other contact into engagement with said one contact at a predetermined vehicle speed for energizing said electrical means.

8. A speed control device according to claim 7, in which said governor is adjustable to adjust the vehicle speed at which said pair of contacts are engaged.

9. A speed control device according to claim 7, in which said governor is connected to said contact carrying means by a yieldable connection to limit the pressure of said other contact against said one contact.

10. A speed control device for an automotive vehicle having a driver-operated throttle control member, comprising an operating member adapted to be moved in one direction by said control member on advancing movement thereof, electrical means for opposing movement of said operating member in said direction, an energizing circuit for said electrical means including a pair of contacts, one carried by and movable with said operating member, a governor responsive to the speed of the vehicle, a pair of movable elements, one element carrying the other contact and movable toward said operating member to engage said contacts and the other element being movable by said governor and having a connection with said one element to cause the latter normally to move with said other element whereby said contacts are engaged at a predetermined vehicle speed to energize said electrical means, said connection being yieldable to limit the pressure between the contacts.

11. A speed control device for an automotive vehicle having a driver-operated throttle control member, comprising a rotatable member adapted to be rotated in one direction by said control member on advancing movement of the latter, an electric motor for applying a torque to said rotatable member in opposition to rotation in said direction, an energizing circuit for said motor including a pair of contacts, one contact being carried by and rotatable with said rotatable member, a lever mounted substantially coaxially with said rotatable member and carrying the other contact, and a governor responsive to the speed of the vehicle and operable to swing said lever for engaging said contacts to energize said motor at a predetermined vehicle speed.

12. A speed control device for an automotive vehicle having a driver-operated throttle control member, comprising a shaft, a rotatable member mounted on said shaft and adapted to be rotated in one direction by said control member on advancing movement of the latter, an electric motor for applying a torque to said rotatable member in opposition to rotation in said direction, an energizing circuit for said motor including a pair of contacts, one contact being carried by and rotatable with said rotatable member, a governor responsive to the speed of the vehicle, and lever means mounted on said shaft and carrying the other contact and swingable by the governor to move said other contact into engagement with said one contact at a predetermined vehicle speed for energizing the motor.

13. A speed control device according to claim 12, in which said lever means comprises a pair of levers mounted on said shaft, one carrying said other contact and the other swingable by the governor, and a yieldable connection between said levers to limit the pressure between said contacts.

14. A speed control device according to claim 12, in which said lever means comprises a pair of levers mounted on said shaft, one lever carrying said other contact and the other lever swingable by the governor, and a torsion spring tending to hold said levers together for joint movement but yieldable on engagement of said contacts to limit the pressure therebetween.

15. A speed control device for an automotive vehicle having a throttle and a driver-operated throttle control member connected to the throttle, said device comprising a rotatable member adapted to be connected to said control member for rotating said rotatable member in one direction on advancing movement of said control member from idle position, an electric motor, gearing driven by said motor and including a gear member coaxial with said rotatable member and having a lost-motion connection with said rotatable member for applying the torque of said motor in opposition to rotation of said rotatable member in said direction, and means responsive to the speed of the vehicle for energizing said motor and applying said torque at a predetermined vehicle speed, said lost-motion connection permitting said rotatable member to be rotated in the opposite direction without driving said motor when said control member is permitted to return to idle position.

16. A speed control device for an automotive vehicle having a driver-operated throttle control member and a battery having one of its terminals grounded to the vehicle, comprising an operating member adapted to be moved in one direction by said control member on advancing movement thereof, electrical means for opposing movement of said operating member in said direction, said electrical means having a pair of terminals, one of which is adapted to be connected to the other terminal of said battery, a contact carried by and insulated from said operating member and connected to the other terminal of said electrical means, a governor responsive to the speed of the vehicle, and means adapted to be grounded to the vehicle and having another contact mounted thereon, said last-mentioned means being movable by the governor to move said other contact into engagement with the first-mentioned contact at a predetermined vehicle speed for energizing said electrical means.

17. A speed control device for an automotive vehicle having a driver-operated throttle control member, comprising a rotatable member adapted to be connected to said control member for rotation in opposite directions by movement of the latter in opposite directions, means including a rotatable element adapted to be secured to said rotatable member for selectively applying a torque to said rotatable member in opposite directions, and means responsive to the speed of the vehicle for energizing said torque applying means for applying a torque to said rotatable member for advancing said control member to bring the vehicle up to a predetermined speed and for energizing said torque applying means for applying a torque to said rotatable member in the opposite direction to resist advancing movement of said control member when the vehicle reaches said predetermined speed.

18. A speed control device for an automotive vehicle having a driver-operated throttle control member, comprising a rotatable member adapted to be connected to said control member for rotation in opposite directions by movement of the latter in opposite directions, a reversible electric motor drive including a rotatable element adapted to be secured to said rotatable member for selectively applying a torque to said rotatable member in opposite directions, and means responsive to the speed of the vehicle for energizing said motor drive for rotation in one direction for applying a torque to said rotatable member for advancing said control member to bring the vehicle up to a predetermined speed and for energizing said motor drive for rotation in the opposite direction for applying a torque to said rotatable member in the opposite direction to resist advancing movement of said control member when the vehicle reaches said predetermined speed.

19. A speed control device for an automotive vehicle having a driver-operated throttle control member, comprising a first rotatable member adapted to be connected to said control member for rotation in opposite directions on movement of the latter in opposite directions, a second rotatable member engageable with said first member, a reversible electric motor for rotating said second member for selectively applying a torque to said first member in opposite directions, a motor circuit including a pair of branch circuits respectively connected to the motor for effecting rotation thereof in opposite directions, a governor responsive to the speed of the vehicle, and a member movable by the governor and cooperating with said second member for energizing one of said branch circuits for operating the motor in one direction for applying a torque to said first member in a direction for advancing said control member to bring the vehicle up to a predetermined speed when the vehicle is below said predetermined speed and cooperating with said first member for energizing the other branch circuit for operating the motor in the opposite direction for applying a torque to said first member in the opposite direction to resist advancing movement of said control member when the vehicle reaches said predetermined speed.

20. A speed control device according to claim 19, in which said governor is adjustable to adjust the speed at which said governor member is moved from a position for energizing said one branch circuit to a position for energizing said other branch circuit.

21. A speed control device according to claim 19, in which said branch circuits include a pair of spaced contacts, one for each circuit, and said governor member extends between and carries a pair of contacts respectively engageable with said spaced contacts on movement of said governor member by said governor for energizing the respective branch circuits.

22. A speed control device according to claim 19, in which said electric motor has a field winding connected intermediate its ends to the armature of the motor with the connection located nearer one end of the field winding than the other end, and said one branch circuit is connected to said one end of the field winding and said other branch circuit is connected to said other end of the field winding.

23. A speed control device for an automotive vehicle having a throttle and a driver-operated throttle control member connected to said throttle, said device comprising a rotatable member adapted to be connected to said control member for movement therewith, an electric motor drive including a rotatable element engageable with said member for applying a torque to said rotatable member in a direction for advancing said control member, and means responsive to the speed of the vehicle for energizing said motor drive for advancing said control member to bring the vehicle up to a predetermined speed when the vehicle is below said predetermined speed, said means being operable to deenergize said motor drive when the vehicle reaches said predetermined speed.

24. A speed control device for an automotive vehicle having a driver-operated throttle control member connected to the fuel supply apparatus for the engine of the vehicle, comprising a pair of concentric rotatable members, one rotatable member being adapted to be connected to said control member for movement therewith, manually controlled means for securing said rotatable members for rotation together, an electric motor connected to the other rotatable member for rotating said one rotatable member in a direction to advance said control member when said rotatable members are secured together, and means responsive to the speed of the vehicle and the movement of said one rotatable member for energizing said motor for advancing said control member to bring the vehicle up to a predetermined speed when the vehicle is below said predetermined speed, said means being operable to deenergize said motor when the vehicle reaches said predetermined speed.

25. A speed control device for an automotive vehicle having a driver-operated throttle control member, comprising a pair of concentric rotatable members, one rotatable member being adapted to be connected to said control member for movement therewith, manually controlled means for securing said rotatable members for rotation together, an electric motor connected to the other rotatable member for rotating said one rotatable member in a direction to advance said control member when said rotatable members are secured together, a circuit for said motor including a pair of contacts engageable for closing said circuit, one of said contacts being carried by said other rotatable member, a governor responsive to the speed of the vehicle, and a lever movable by the governor and carrying the other of said pair of contacts, said lever being held by the governor with said contacts in engagement, when the vehicle is below a predetermined speed, to energize the motor for advancing said control member to bring the vehicle up to said predetermined speed and being movable by the governor to disengage said contacts and thereby deenergize said motor when the vehicle reaches said predetermined speed.

26. A speed control device according to claim 25, in which said governor is adjustable to adjust the speed at which said lever is movable to disengage said contacts to deenergize said motor.

27. A speed control device according to claim 25, in which said circuit includes another pair of contacts engageable on said rotatable members being secured together by said manually controlled means.

28. A speed control device for an automotive vehicle having a driver-operated throttle control member, comprising a first rotatable member adapted to be connected to said control member for movement therewith, a second rotatable member concentric with said first member, an electromagnet carried by said second member, an armature carried by said first member, a manually controlled circuit for energizing said electromagnet to hold said armature in engagement with said electromagnet and thereby secure said first and second members for rotation together, an electric motor connected to said second member for rotating said first member in a direction to advance said control member when said electromagnet is energized, and means responsive to the speed of the vehicle for energizing said motor for advancing said control member to bring the vehicle up to a predetermined speed when the vehicle is below said predetermined speed, said means being operable to deenergize said motor when the vehicle reaches said predetermined speed.

29. A speed control device according to claim 28, in which said armature is resiliently carried by said first member and is moved into holding engagement with said electromagnet when the latter is energized and is urged away from said electromagnet when the latter is deenergized to detach said first member from said second member.

30. A speed control device according to claim 28, in which said motor has a circuit including a pair of contacts normally out of engagement with each other but adapted to be moved into engagement by movement of said armature into engagement with said electromagnet whereby said motor can be energized only when said first and second members are secured together.

31. A speed control device according to claim 28, in which said motor has a circuit including two pairs of contacts in series, one pair being normally out of engagement with each other but adapted to be moved into engagement by movement of said armature into engagement with said electromagnet, and the other pair being held in engagement by said speed responsive means when the vehicle is below said predetermined speed and being adapted to be disengaged by said means when the vehicle reaches said predetermined speed.

32. A speed control device according to claim 28, in which said manually controlled circuit includes a manually operable switch for closing said circuit, and a second switch in parallel with said manually operable switch and adapted to be closed by said armature moving into engagement with said electromagnet to maintain said electromagnet energized on release of said manually operable switch.

33. A speed control device according to claim 28, in which said manually controlled circuit is adapted to be closed for energizing said electromagnet by grounding the circuit, said circuit including a manually operable switch for grounding the circuit and thereby energizing said electromagnet, and a contact engageable by said armature when moved into engagement with said electromagnet for establishing a ground through said armature to maintain said electromagnet energized on release of said manually operable switch.

34. A speed control device for an automotive vehicle having a driver-operated throttle control member, comprising a housing, a shaft mounted in the housing, a member rotatably mounted on said shaft within the housing and having a hub portion extending exteriorly of said housing, a lever mounted on said hub portion exteriorly of said housing and adapted to be connected to said control member, a gear member mounted on said hub portion within said housing for actuating said rotatable member, an electric motor mounted on said housing and having a gearing connection with said gear member for applying torque to said rotatable member, a governor mounted within said housing and responsive to the speed of the vehicle, and lever means pivotally mounted on said shaft within said housing and actuated by said governor, said lever means controlling the energization of said motor.

35. A speed control device for an automotive vehicle having a driver-operated throttle control member, comprising a first rotatable member adapted to be rotated in one direction by said control member on advancing movement of the latter, a second rotatable member concentric with said first member and movable in the opposite direction into engagement with said first member, drive means for moving said second member into engagement with said first member for opposing movement thereof in said one direction, means responsive to the speed of the vehicle, means for energizing said drive means, and control means actuated by said speed-responsive means for rendering said energizing means operable at a predetermined vehicle speed.

36. A speed control device for an automotive vehicle having a driver-operated throttle control member, comprising a member adapted to be moved in one direction by said control member on advancing movement of the latter, a second member movable in the opposite direction into engagement with said first member, drive means connected to said second member for moving said second member into engagement with said first member, means including an element movable in response to the speed of the vehicle, and control means actuated by movement of said element and said first member for energizing said drive means at a predetermined vehicle speed.

37. A speed control device for an automotive vehicle having a driver-operated throttle control member, comprising a member adapted to be moved in one direction by said control member on advancing movement of the latter, electric drive means for opposing movement of said movable member in said one direction, and control means actuated by movement of said movable member and in response to the speed of the vehicle for energizing said electric drive means at a predetermined vehicle speed.

38. A speed control device for an automotive vehicle having a driver-operated throttle control member, comprising a member movable with said control member on movement of the latter, electric drive means for moving said movable member to thereby move said control member, and control means actuated in response to the speed of the vehicle and by the movement of said movable member for controlling the energization of said electric drive means at a predetermined vehicle speed.

References Cited in the file of this patent

UNITED STATES PATENTS

| | | |
|---|---|---|
| 1,350,446 | Fynn | Aug. 24, 1920 |
| 2,001,590 | Spiller | May 14, 1935 |
| 2,014,854 | Lothrop | Sept. 17, 1935 |
| 2,127,454 | Wolfe et al. | Aug. 16, 1938 |
| 2,193,927 | Jivkovitch | Mar. 19, 1940 |
| 2,302,322 | Howard | Nov. 17, 1942 |
| 2,313,505 | Benjamin | Mar. 9, 1943 |
| 2,661,071 | Hoener | Dec. 1, 1953 |
| 2,714,880 | Riley | Aug. 9, 1955 |
| 2,755,877 | Kelem | July 24, 1956 |
| 2,816,617 | Lee | Dec. 17, 1957 |
| 2,822,881 | Treharne | Feb. 11, 1958 |
| 2,897,906 | Brueder | Aug. 4, 1959 |

FOREIGN PATENTS

| | | |
|---|---|---|
| 494,174 | Great Britain | Oct. 21, 1938 |